United States Patent [19]

Mohnach et al.

[11] 4,161,798
[45] Jul. 24, 1979

[54] FINER ADJUSTMENT WINDSHIELD ARM MOUNTING HEAD

[75] Inventors: Michael G. Mohnach; William H. Harbison, both of Valparaiso; Robert O. Wittwer, Portage, all of Ind.

[73] Assignee: The Anderson Company, Gary, Ind.

[21] Appl. No.: 783,939

[22] Filed: Apr. 1, 1977

[51] Int. Cl.² .............................. B60S 1/08; B60S 1/26
[52] U.S. Cl. ............................. 15/250.13; 15/250.34
[58] Field of Search ........... 15/250.34, 250.71, 250.32, 15/250.35, 250.13

[56] References Cited

U.S. PATENT DOCUMENTS

| | | | |
|---|---|---|---|
| 2,642,611 | 6/1953 | Anderson | 15/250.34 |
| 3,161,902 | 12/1964 | Scinta | 15/250.34 |

*Primary Examiner*—George F. Mautz
*Attorney, Agent, or Firm*—Wegner, Stellman, McCord, Wiles & Wood

[57] ABSTRACT

A fine angular adjustment is provided between a windshield wiper arm and a windshield wiper drive shaft without changing the standard drumhead or drive burr carried by said drive shaft. Provision is made for fine adjusting the angular orientation of the arm by increments of one degree. In two embodiments, the mounting head of the arm is in two parts with the first part fixed to the drumhead of the drive shaft and the second part having incremental teeth being spring urged into contact with mating incremental teeth on the first part, such that actuating the spring separates said incremental teeth of the two parts making it possible to rotate the second part relative to the first part in approximately one degree increments. Another embodiment provides for offset openings in the mounting head with flutes in each opening being offset from a centerline a predetermined amount such that assembly of the mounting head on a drumhead in one or the other of said openings will provide the arm with one degree increments of orientation.

11 Claims, 11 Drawing Figures

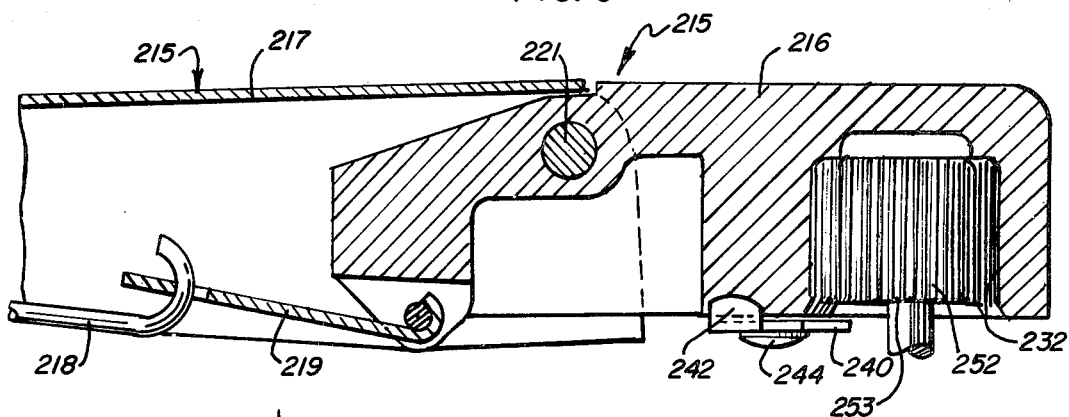
FIG. 9
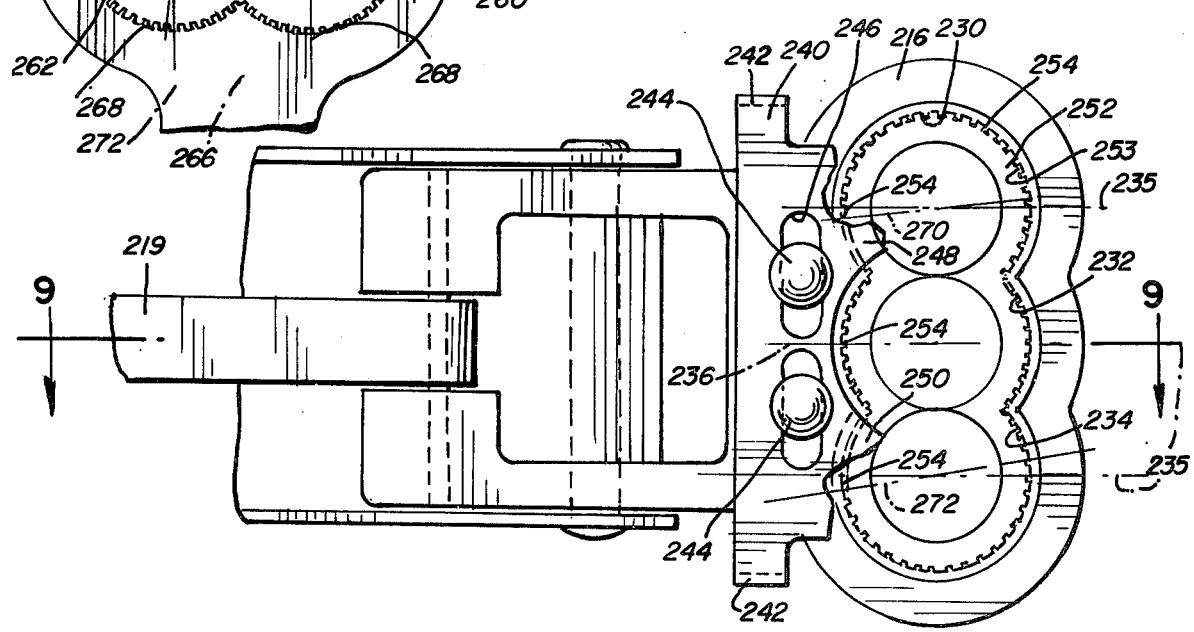
FIG. 11
FIG. 10

FINER ADJUSTMENT WINDSHIELD ARM MOUNTING HEAD

BACKGROUND OF THE INVENTION

1. Field of the Invention

This invention relates to mountings for windshield wiper arms onto drive shafts and, more particularly, to a fine angular adjustment of a windshield wiper arm on a drum-head of a drive shaft.

2. Description of the Prior Art

In the automotive field, it has become reasonably standard practice to have at least two drive shafts extending outwardly along the edge of the windshield. Windshield wiper arms for use on said drive shafts have mounting heads with openings for receiving drumheads mounted on said drive shafts for securing the arms to the drive shafts. The standard that has been adopted for the drumheads or drive burrs calls for 84 parallel flutes or ribs being formed on the drumhead or drive burr with said flutes being equally spaced apart around the periphery of the drumhead. The standard mounting head opening for engagement with the drive burr has 42 flutes or ribs resulting in the arm being positionable on the shaft with an adjustment no finer than approximately 2.14 degrees. Therefore, when a wiper arm is attached to the drumhead, there is approximately a four degree difference between each successive location of the arm relative to the shaft. This results in the possibility that the wiper arm will be parked either on top of the belt line of the windshield or will be spaced from the belt line and in the field of vision of a person looking out of the windshield. Many different systems have been proposed for making a fine adjustment between adjacent settings of an arm on a drive shaft.

SUMMARY OF THE INVENTION

We have provided an improved wiper arm adjusting arrangement whereby a wiper arm may have a fine adjustment between adjacent settings on a drumhead or drive burr on a drive shaft. That is, between each adjacent setting we provide a one degree adjustment such that the arm may be adjusted to an accurate and desirable setting relative to the edge of the windshield. This is accomplished in the preferred embodiment by providing the mounting head of the wiper arm with an insert, which insert is secured to the drumhead on a shaft. A spring urges a toothed portion of the mounting head against a toothed position on the insert. The teeth on the mounting head and on the insert are spaced apart one degree such that depressing the spring to disengage the teeth will make it possible to rotate the mounting head and arm in one degree increments relative to the insert.

In a modified form of the invention, two or more openings are provided in the mounting head with parallel, equally spaced flutes formed in each opening. The flutes in one opening are rotated a degree or two with respect to the flutes in the other openings. In this way, depending upon which angular direction it is desired to set the arm with respect to the initial setting, it is only necessary to move the arm from one opening to the other, thereby resulting in the longitudinal axis of the arm being adjusted by one degree increments relative to the previous setting.

Since the standard drive burr has 84 flutes and most mounting heads have 42 flutes, the initial difference from one setting to the next is approximately four degrees, therefore, any fine adjustment between zero and four degrees will result in an improved location of the arm and blade on the windshield. The embodiments set forth herein provide for adjustments of approximately one degree which has been found to be perfectly adequate to align the wiper arm properly with respect to the edge of the windshield.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 9 is an elevational cross-sectional view taken along the lines 9—9 of FIG. 10 and shows still a third modified form of our invention;

FIG. 10 is a bottom plan view of our invention as shown in FIG. 9; and

FIG. 11 is still a fourth modified form of our invention showing a bottom plan view thereof.

DESCRIPTION OF THE PREFERRED EMBODIMENT

Figure 1:
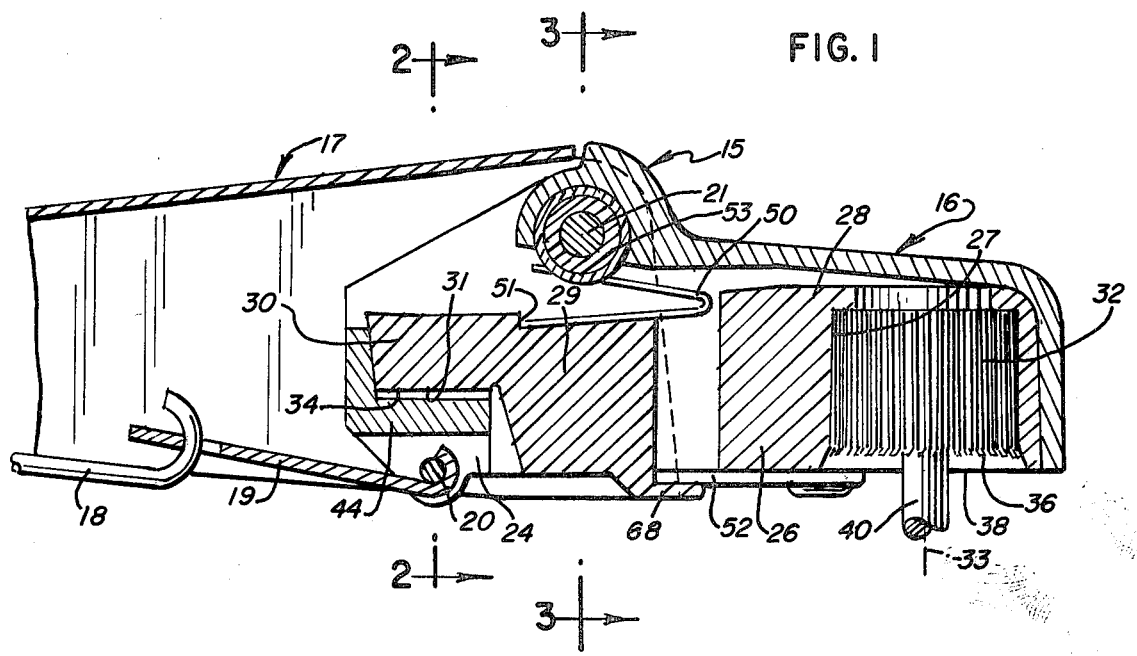
FIG. 1 is an elevational cross-sectional view taken along the lines 1—1 of FIG. 3 showing one preferred embodiment of our invention.

A windshield wiper arm assembly 15 generally includes, among other things, a mounting head 16, a channel-shaped intermediate section 17 pivotally connected to the mounting head 16 by means of a pivot pin 21, and a bar extension section (not shown) to which a windshield wiper blade is attached. A spring 18 is connected between the bar extension or the outer end of the channel section 17 and, by means of spring extension 19, is connected to a pin 20 extending between the sides 22 and 24 of the mounting head 16. The arm 15 and mounting head 16 have a longitudinal axis 21 extending the full length thereof.

The mounting head 16 is die cast, or the like, and has an elongate insert member 26 nested therein, which insert 26 has a cylindrical opening 27 formed in one end portion 28 thereof and a forwardly extending tongue 30 projecting outwardly from the opposite end portion 29 thereof. The cylindrical opening 27 has a plurality of equally spaced apart, parallel flutes 32 formed around the inner peripheral surface thereof. Standard accepted practice in the trade provides for 42 individual flutes 32 equally spaced apart by 8.56 degrees. The tongue member 30 has a lower surface 31 in which is formed a plurality of teeth 34 which radiate out from a point on the longitudinal axis 33 of the cylindrical opening 27. The teeth 34 are, therefore, radially disposed teeth 34 as can best be seen in dotted lines in FIG. 4 and are spaced apart one degree as measured from the root of one tooth to the root of the next tooth. The insert member 26 is secured over a drumhead or drive burr 36 carried on the upper end of the drive shaft 40. The drumhead 36 has a plurality of equally spaced apart flutes 38, two of which flutes 38 nest between each adjacent pair of flutes 32 formed in the periphery of the opening 27 in the insert member 26. The drumhead or drive burr 36 has 84 flutes formed thereon which is standard in the trade such that each adjacent pair of flutes 38 are spaced apart 4.28 degrees. Therefore, the windshield wiper arm will be rotated approximately four degrees when the insert member 26 is rotated from one setting with one set of flutes 32 in the insert 26 engaging one set of flutes 38 on the drumhead 36 to engage said flutes 32 on the insert 26 with the next adjacent set of flutes 38 on said drumhead 36. It has been found in practice that the approximate four degree adjustment between adjacent flutes 38 is too much to afford proper and accurate adjustment of the positioning of the windshield wiper arm relative to the edge of the windshield.

Figure 2:
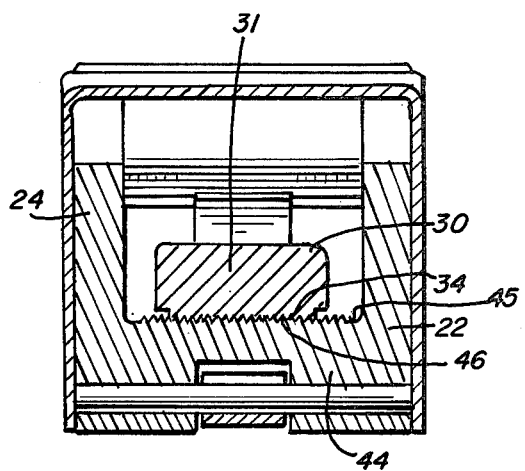
FIG. 2 is a cross-sectional view taken along the lines 2—2 of FIG. 1.
Figure 3:
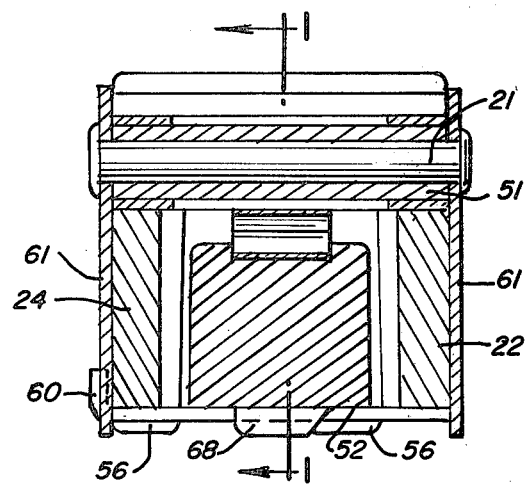
FIG. 3 is a cross-sectional view taken along the lines 3—3 of FIG. 1.

The mounting head 16 has a bridge portion 44 extending between the side walls 22 and 24 with said bridge portion 44 being best illustrated in FIG. 2 and having an upper surface 45 in which is formed a plurality of radially extending teeth 46, said teeth 46 being formed along radii with a center on the axis 33 of the opening 27 in the insert member 26. The spacing between the crests or roots of adjacent teeth 46 on the bridge 44 is one degree so as to match the spacing between the mating teeth 34 formed on the lower surface 31 of the tongue 30 on the insert member 26. A U-shaped spring member 50 is positioned between a recessed portion 51 on the top surface of the insert member 26 and the bottom surface of the bushing 53 surrounding the pivot pin 21. The spring 50 is loaded in such a way that there is a continuous upward force on the bridge portion 44 of the mounting head 16 relative to the insert member 26. In this way, the teeth 46 on the bridge portion 44 are constantly held in engagement with the teeth 34 on the insert member 26. The insert member 26 has a longitudinal axis 25 which coincides with the longitudinal axis 21 of the arm when the insert 26 is centered in the opening in the mounting head 16.

A transversely, sliding latch member 52 is slidably attached to the bottom surface of the mounting head 16 by means of two spaced apart lugs 56 passing through two elongate slots 58 in said latch member 52. The latch member 52 has a handle 60 projecting outwardly and upwardly along the outer surface of the mounting head 16. With the handle 60 pressed toward the side wall of the mounting head 16, an overhanging latch portion 62 of the latch member 52 is in an overlapping position relative to the drumhead 36 on the drive shaft 40. In this way, the wiper arm is locked to the drive shaft 40 ready for use. The latch member 52 has a forwardly extending portion 63 which has one edge lying parallel to the inside of the wall 61 of the channel 17. The side walls 61 of the channel 17 have rear edges 64,65 which lie in overlapping relationship to side walls of the mounting head 16. The rear edges 64,65 of the channel 17 normally overlap the portion 63 of the latch member 52 when the arm 15 is in operative position on the shaft 40. To remove the arm 15 from the shaft 40, the channel portion 17 of the arm 15 is grasped and is rotated clockwise, as viewed in FIG. 1, until the rear edge 64 of the side wall 61 of the channel 17 clears a front edge of the portion 63 of the latch 52. The handle 60 of the latch 52 can then be grasped and moved sideways so that the front edge of portion 63 of the latch 52 overlaps the rear edge 64 of the channel 17, whereupon release of the channel 17 will cause the rear edge 64 of the channel 17 to engage with the portion 63 of the latch 52 to hold the spring 18 tensioned and to hold the outer end of the wiper arm 15 spaced from the windshield. The latch portion 62 of the latch member 52 is now displaced from overlapping relationship with the bottom surface of the drumhead 36 and, accordingly, it is now possible to remove the mounting head 16 and the arm 15 from the drumhead 36 of the shaft 40.

Figure 4:
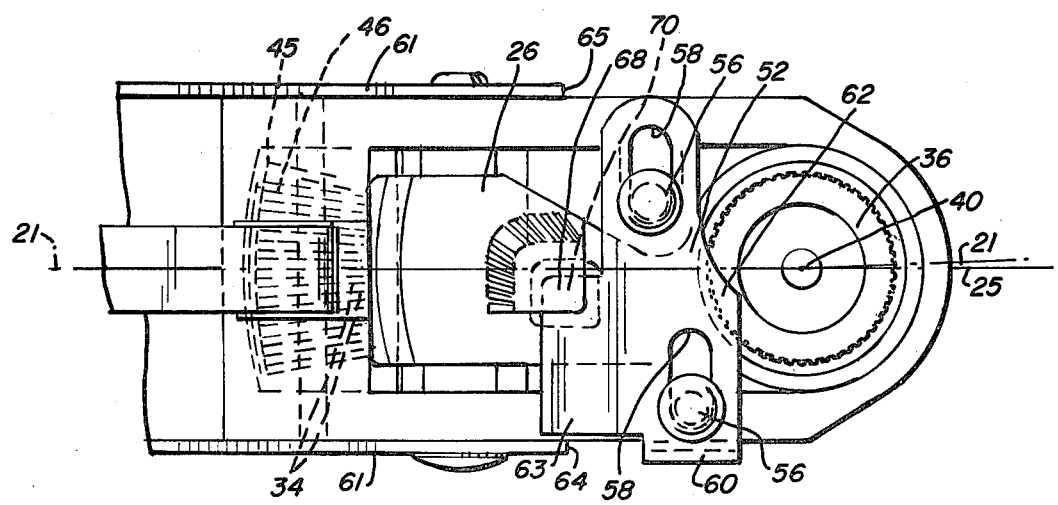
FIG. 4 is a bottom plan view of the windshield wiper arm as shown in FIG. 1.
Figure 5:
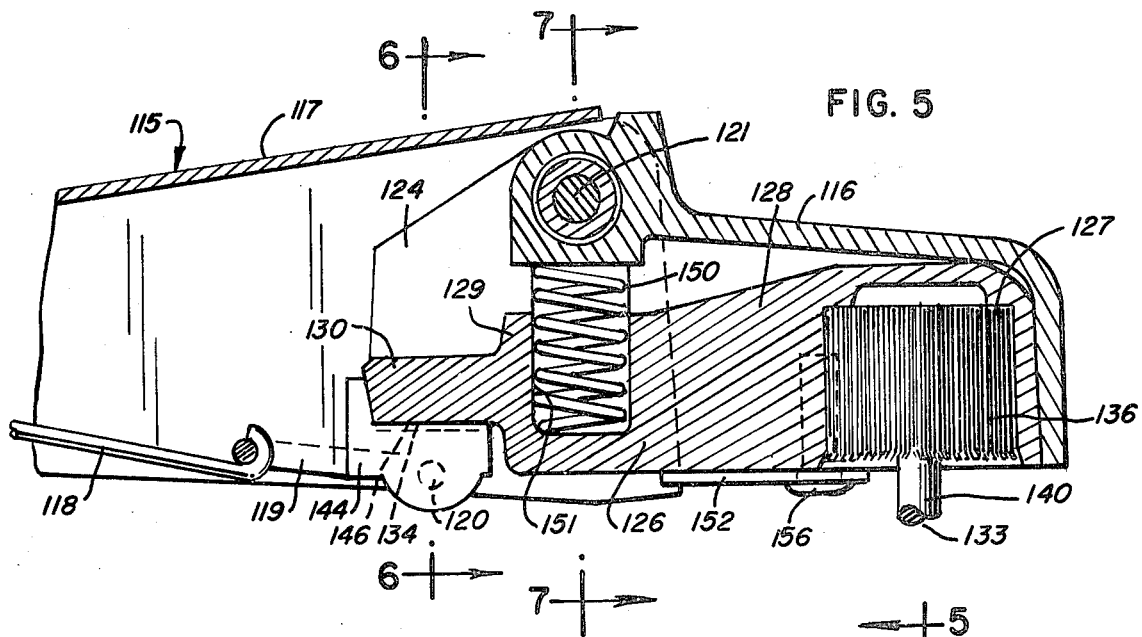
FIG. 5 is an elevational cross-sectional view taken along the lines 5—5 of FIG. 7 showing another preferred embodiment of our invention.
Figure 6:
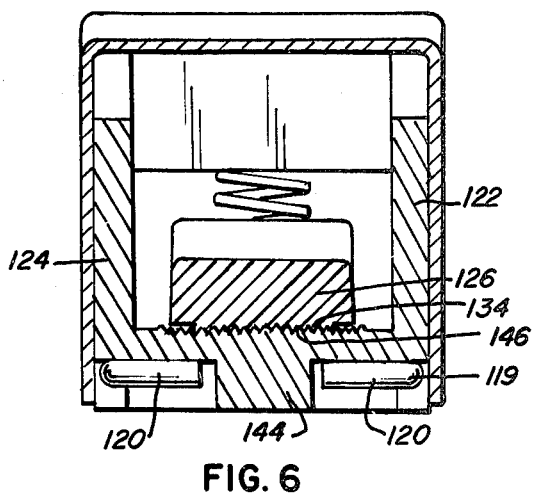
FIG. 6 is a cross-sectional view taken along the lines 6—6 of FIG. 5.
Figure 7:
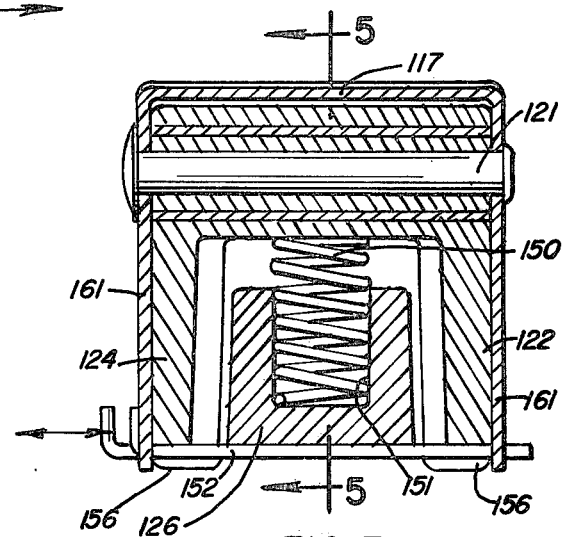
FIG. 7 is a cross-sectional view taken along the lines 7—7 of FIG. 5.
Figure 8:
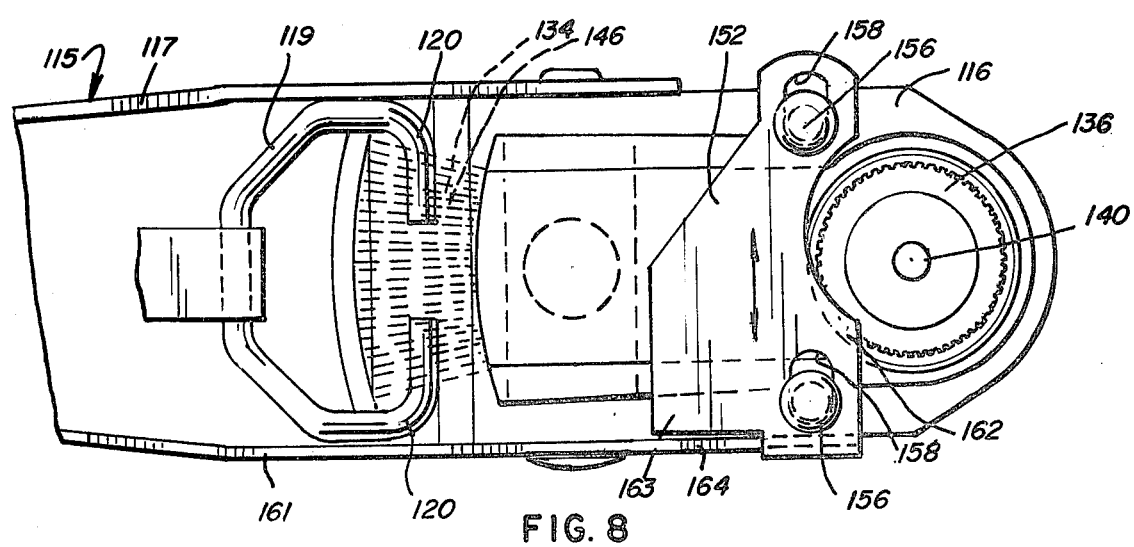
FIG. 8 is a bottom plan view of the windshield wiper arm as shown in FIG. 5.

To add stability to the latch member 52 and to lock the insert member 26 to the mounting head 16, an interconnection is provided between the latch member 52 and the insert member 26 to effect a positive locking arrangement therebetween. Specifically, an overhanging tab 68 is provided on the insert member 26 in alignment with a locking portion 70 of the latch member 52. When the latch member 52 is in latching position, as shown in FIG. 4, with the latch portion 62 in overlapping relationship with respect to the drumhead 36 of the shaft 40, the locking portion 70 of the latch 52 is seated between the bottom wall of the insert member 26 and the overhanging tab 68 so that it is not possible for the mounting head 16 to be moved relative to the insert member 26.

To fine adjust the arm 15 relative to the drive shaft 40 and to make it possible to remove the arm 15 from said drive shaft 40, the channel portion 17 of the arm 15 is raised and the latch member 52 is moved outwardly so that portion 63 of the latch member 52 is engaged by the rear edge 64 of the channel 17 upon release of said channel 17. Movement of the latch member 52 disengages the locking portion 70 from the overhanging tab 68 thereby releasing the interlock between the insert member 26 and the mounting head 16 and moves the latch portion 62 out of overlapping relationship with the drumhead 36 thereby releasing the interlock between the arm 15 and the drive shaft 40. The angular relationship of the arm 15 relative to the shaft 40 or relative to the longitudinal axis 33 of the insert member 26 can now be adjusted in increments of one degree. This is accomplished by depressing the mounting head 16 relative to the insert member 26 until the teeth 46 on the mounting head 16 are disengaged from the teeth 34 on the insert member 26 whereupon the arm 15 and mounting head 16 can be pivoted about the axis of the shaft 40 relative to the insert member 26. Each advancement of the mounting head 16, one tooth at a time, relative to the insert member 26 will move the arm 15 one degree relative to its previous position so as to open up a one degree (or more) angle between the longitudinal axis 21 of the arm and the longitudinal axis 25 of the insert 16.

In practice, if the windshield wiper arm is not in proper alignment with the edge of the windshield, the latch member 52 is positioned to block the channel 17 of the arm 15 from moving the blade on the arm into engagement with the windshield, and the insert member 26 will be released from the mounting head 16. It is now possible to depress the mounting head 16 relative to the insert member 26 to disengage the teeth 46 from the teeth 34. The mounting head 16 and arm 15 are now moved either clockwise or counterclockwise relative to the insert member 26 until the outer edge of the arm 15 is in proper position with respect to the edge of the windshield. The mounting head 16 is then released so that the teeth 46 can reengage with the teeth 34 and thereby lock the longitudinal axis of the arm 15 with respect to the drive shaft 40. Since the increments between adjacent teeth 34, 34, and 46, 46 are one degree, it is possible to adjust the longitudinal axis of the arm 15 in increments of one degree from its previous setting. Once the arm 15 is properly oriented with respect to the axis of the drive shaft 40, the channel portion 17 of the arm 15 is lifted slightly so that the latch member 52 can be pushed into latching position within the confines of the arm 15. The latch portion 62 of the latch member 52 will latch below the drumhead 36 of the drive shaft 40 and the lock portion 70 of the latch member 52 will be positioned below the tab 68 on the insert member 26, thereby locking the insert member 26 to the mounting head 16 to thereby avoid inadvertent adjustment of the mounting head 16 relative to the insert 26.

In another preferred embodiment of the invention, such as shown in FIGS. 5 through 8, a wiper arm 115 has a mounting head 116 pivotally connected by pin 121 to the channel portion 117. A spring 118 is connected to the mounting head 116 by means of a bail 119. The ends 120 of the bail 119 engage in openings in the lower portion of the mounting head 116. An insert member 126 is nested in the mounting head 116 and has a fluted opening 127 formed in one end portion 128 thereof with a tongue member 130 projecting outwardly from the other end portion 129 thereof. A coil spring 150 extends between a flat portion of the casting of the mounting head 116 in alignment with the pivot 121 and extends into a socket 151 formed in the insert member 126. The mounting head 116 has a bridge portion 144 extending between the side walls 122 and 124. The spring 150 serves to urge the bridge 144 of the mounting head 116 into engagement with the tongue 130 of the insert member 126. The tongue 130, on the insert member 126, and the bridge 144, on the mounting head 116, have radially oriented teeth 134 and 146, respectively, extending along radii having a common longitudinal axis 133 of the drive shaft 140. The spacing between the roots of adjacent teeth 134 on the tongue 130 or the teeth 146 on the bridge 144 is one degree. Therefore, moving the bridge 144 from one tooth to the next tooth relative to the insert member 126 will cause the mounting head 116 to be adjusted by one degree relative to the insert member 126 about the longitudinal axis 133 of the drive shaft 140.

A transversely sliding latch member 152 is slidingly attached to the bottom surface of the mounting head 116 by means of a pair of headed rivets 156 extending through elongate slots 158 formed in the body of the latch member 152. A latching portion 162 of the latch member 152 overlaps with the edge of a drumhead 136 on the drive shaft 140 when the latch member 152 is in the latching position. The latch 152 has a forwardly extending catch portion 163 which is normally overlapped by the side walls 161 of the channel 117 when the latch portion 162 is in latching position below the drumhead 136. When the channel portion 117 of the arm 115 is pivoted away from the windshield and the latch 152 is moved sidewardly and outwardly relative to the mounting head 116, the latch portion 162 will be removed from overlapping relationship with the drumhead 136, the forward catch portion 163 of the latch member 152 aligns with the rear edge 164 of the wall 161 of the channel 117 so that release of the channel member 117 will cause the rear edge 164 to engage with the catch portion 163 and hold the outer end of the wiper arm 115 removed from the windshield. The mounting head 116 and the wiper arm 115 can now be removed from the drumhead 136 by lifting the mounting head 116 axially away from the drumhead 136 on the drive shaft 140.

To fine adjust the angular position of the longitudinal axis of the wiper arm 115 relative to the longitudinal axis of the insert member 126, it is only necessary to depress the mounting head 116 relative to the insert member 126 until the teeth 146 on the bridge 144 disengage from the teeth 134 on the tongue 130 on the insert member 126. The arm 115 can now be shifted to the left or to the right until the outer end of the arm 115 is in proper position with respect to the belt line of the windshield. Upon releasing the downward force on the mounting head 116, the teeth 134 on the tongue 130 and the teeth 146 on the bridge 144 will reengage and thereby lock the longitudinal axis of the wiper arm 115 in the position desired relative to the longitudinal axis of the insert member 126. The angular adjustment of the wiper arm 115 relative to the insert member 126 can be accomplished not only when the latch member 152 is engaged below the drumhead 136 of the drive shaft 140, but also when the latch member 152 is engaged with the rear edge of the channel 117 of the wiper arm.

A third embodiment of our invention, as shown in FIGS. 9 and 10, provides for a mounting head 216 on a windshield wiper arm 215 being pivotally mounted to the channel portion 217 of the arm 215 about a pivot pin 221. The spring 218 and link 219 serve to pivot the outer end of the wiper arm 215 toward the surface to be wiped. As shown in FIG. 10, the mounting head 216 has three side-by-side sockets or openings 230, 232, 234 formed therein. Each opening has an axis 235 lying along a diameter, which axes are parallel to each other, with the axis 235 of opening 232 coinciding with the longitudinal axis 236 of the arm 215. A latch means 240 is slidably staked to the bottom surface of the mounting head 216 and is comprised of an elongate, transversely movable member having upstanding handle portions 242 on each end thereof. A pair of rivets 244 pass through elongate slots 246 formed in the body of the latch, such that the latch 240 can be shifted transverse to the mounting head 216 in such a way as to move latching portions 248, 250 into overlapping a portion of at least one of the openings 230, 232, 234 so as to latch the arm 215 to a drumhead 252 on a drive shaft 240.

This modification is directed to the relative orientations of the flutes in each of the three openings. Each drumhead 252 has 84 parallel, equally spaced flutes 253 formed on the surface thereof with the spacing between each adjacent flute being approximately four degrees. Each opening 230, 232, 234 has 42 flutes 254 formed in the walls thereof which flutes are equally spaced apart approximately eight degrees. The central opening 232 has the flutes 254 oriented in such a way that one flute 254 has its crest lying directly on the longitudinal axis 236 of the wiper arm 215. The one side opening 230, as viewed in FIG. 10 being the upper opening, has the flutes 254 rotated by one degree so that the crest of one of the flutes 254 is displaced from the axis 235 of the opening 230 by approximately one degree. An axis 270 passes through the displaced flute 254 and the center of the opening 232 so as to subscribe an angle with axis 235 of one degree. In the form shown, the flutes 254 in opening 232 are rotated one degree counterclockwise or toward the center of the wiper arm 215. The other opening 234 has the flutes 254 rotated by two degrees so that the crest of one of the flutes 254 is displaced two degrees from the axis 235 of said opening 234 and, as shown, the flute is rotated counterclockwise relative to the axis 235 of said opening 234. An axis 272 passes through the displaced flute 254 in opening 234 and through the center of said opening 234 so as to subscribe an angle with the axis 235 of two degrees.

Since the flutes 254 of all three openings 230, 232, 234 are equally spaced apart, the effect of the one degree shift in the upper opening 230 and the two degree shift in the bottom opening 234 is to position the flutes 254 relative to the center opening 232 in different orientations or positions so that with the drumhead 252 engaged in one of the openings, for instance opening 232, the arm 215 will be oriented differently than said arm would be oriented if said drumhead 252 were engaged in either of the openings 230 or 234. For instance, if the arm 215 is initially assembled with the drumhead 252 by means of the drumhead seating in the center opening 232, the longitudinal axis 236 of the arm 215 will be along one particular axis. Removing the arm 215 and shifting it so that the drumhead 252 engages with the flutes 254 in the upper opening 230, will necessitate rotating the arm 215 one degree with respect to the previous position such that with the arm 215 assembled on the drumhead 252 in the upper opening 230 will cause the longitudinal axis 236 of the arm 215 to be shifted one degree clockwise or counterclockwise relative to the position of the arm 215 when the drumhead 252 is assembled in the center opening 232. Likewise, to assemble the arm 215 with the bottom opening 234 on the drumhead 252 will necessitate rotating the arm 215 an additional degree with respect to the upper opening 230 or two degrees with respect to the middle opening 232 so that the arm 215, when assembled with the bottom opening 234 on the drumhead 252, will position the longitudinal axis 236 of the arm 215 two degrees clockwise or counterclockwise relative to the position of the arm 215 when the drumhead 252 was initially assembled with the center opening 232 or one degree clockwise or counterclockwise relative to the position of the arm when assembled in opening 230.

From the above, it will be clear that an improved apparatus is provided whereby the wiper arm can be fine adjusted by one degree increments from an initial setting without modifying the standard fluting on the drumhead on the drive shaft.

A fourth embodiment is shown in FIG. 11 and is somewhat similar to FIG. 10 and calls for only two openings 260, 262 in a drumhead 264, neither of which opening is on the longitudinal axis 266 of the arm. In this embodiment, the one opening 260 on the right-hand side of FIG. 11, has the crest of one of the flutes 268 lying directly on the axis 270 of the opening, said axis 270 lying parallel to the longitudinal axis 266 of the arm. The opening 262 on the left-hand side of the figure has the crest of a flute 268 oriented one degree off the axis 272 of the opening, said axis 272 lying parallel to the longitudinal axis 266 of the arm. Therefore, an axis 274 through the crest of the flute 268 of opening 262 and through the center of the opening 262 will subscribe an angle of one degree with the axis 272. When the opening 260, on the right-hand side of FIG. 11, is assembled with a drumhead 264, the longitudinal axis 266 of the arm will have one particular orientation. When the drumhead 264 is removed from the right-hand opening 260 and is assembled with the left-hand opening 262, the longitudinal axis 266 of the arm will be rotated one degree from the position previously described with respect to the right-hand opening 260. In this way, the wiper arm is provided with a fine adjustment of one degree without modifying the standard 84 flute drumhead.

From the above, it can be determined that we have provided an improved fine adjustment for a windshield wiper arm on the drumhead of a windshield wiper drive shaft. This is accomplished by either shifting a portion of the wiper arm relative to an insert at one degree increments or by shifting the position of the arm from one opening to another opening in the arm where the mating flutes in the openings are oriented one or more degrees different from the orientation of the initial opening so as to afford the wiper arm with adjustments of one degree.

We claim:

1. A wiper arm having a mounting head, a channel member pivotally connected to said mounting head with a wiper blade supporting extension connected to the outer end portion thereof, said arm having a longitudinal axis extending the length of said arm, a surface formed on said mounting head and having a plurality of teeth formed thereon, insert means nested in said mounting head and having an opening with a plurality of equally spaced flutes formed around the inner surface thereof, said insert means having a longitudinal axis, a surface portion on said insert means having teeth formed thereon and adapted to engage with the teeth on said surface on said mounting head, spring means bearing on said mounting head and on said insert means for urging the teeth on the mounting head into engagement with the teeth on said insert means, a drive shaft having a drumhead on the end portion thereof, a plurality of equally spaced flutes formed on the outer surface of said drumhead, said drumhead seating in said opening in said insert means with the longitudinal axis of the arm having a particular orientation with respect to the longitudinal axis of the insert means, whereby depressing the mounting head and spring means will separate the teeth on said surface on the mounting head from the teeth on the surface of said insert means so that the mounting head and attached arm can be rotated in increments relative to the insert means and whereby releasing said mounting head will reengage the teeth on the surfaces of the insert means and mounting head so that the longitudinal axis of the arm will lie at a different angle to the longitudinal axis of said insert means.

2. A wiper arm as claimed in claim 1 wherein adjacent teeth on said surface of the mounting head and on said surface of the insert means are spaced apart one degree so that moving said mounting head one tooth relative to the teeth on the insert means will reorient the longitudinal axis of the arm one degree from the longitudinal axis of the insert means.

3. A wiper arm having a mounting head, a channel member pivotally connected to said mounting head with a wiper blade supporting extension connected to the outer end portion thereof, said arm having a longitudinal axis extending the length of said arm, a surface formed on said mounting head and having a plurality of teeth formed thereon, said surface on the mounting head is a horizontal bridge member extending between the side walls of said mounting head with said teeth facing upwardly, insert means nested in said mounting head and having an opening with a plurality of equally spaced flutes formed around the inner surface thereof, said insert means having a longitudinal axis, a surface portion on said insert means having teeth fromed thereon and adapted to engage with the teeth on said surface on said mounting head, said surface portion on said insert means is horizontal and has said teeth facing downwardly therefrom, spring means on said mounting head for urging the teeth on the mounting head into engagement with the teeth on said insert means, a drive shaft having a drumhead on the end portion thereof, a plurality of equally spaced flutes formed on the outer surface of said drumhead, said drumhead seating in said opening in said insert means with the longitudinal axis of the arm having a particular orientation with respect to the longitudinal axis of the insert means, whereby depressing the mounting head and spring means will separate the teeth on said surface on the mounting head from the teeth on the surface of said insert means so that the mounting head and attached arm can be rotated in increments relative to the insert means and whereby releasing said mounting head will reengage the teeth on the surfaces of the insert means and mounting head so that the longitudinal axis of the arm will lie at a different angle to the longitudinal axis of said insert means.

4. A wiper arm as claimed in claim 1 wherein latch means are provided on said mounting head for latching said arm to said drumhead on the shaft.

5. A wiper arm having a mounting head, a channel member pivotally connected to said mounting head with a wiper blade supporting extension connected to the other end portion thereof, said arm having a longitudinal axis extending the length of said arm, a surface formed on said mounting head and having a plurality of teeth formed thereon, insert means nested in said mounting head and having an opening with a plurality of equally spaced flutes formed around the inner surface thereof, said insert means having a longitudinal axis, a surface portion on said insert means having teeth formed thereon and adapted to engage with the teeth on said surface on said mounting head, spring means on said mounting head for urging the teeth on the mounting head into engagement with the teeth on said insert means, a drive shaft having a drumhead on the end portion thereof, a plurality of equally spaced flutes formed on the outer surface of said drumhead, said drumhead seating in said opening in said insert means with the longitudinal axis of the arm having a particular orientation with respect to the longitudinal axis of the insert means, whereby depressing the mounting head and spring means will separate the teeth on said surface on the mounting head from the teeth on the surface of said insert means so that the mounting head and attached arm can be rotated in increments relative to the insert means and whereby releasing said mounting head will reengage the teeth on the surfaces of the insert means and mounting head so that the longitudinal axis of the arm will lie at a different angle to the longitudinal axis of said insert means, latch means are provided on said mounting head for latching said arm to said drumhead on the shaft, said latch means is a transversely shiftable member having a latch portion for overhanging said drumhead when said latch means is in the latching position.

6. In a wiper arm as claimed in claim 5 wherein said latch means has a forward portion which lies inside said channel member when the latch portion is in overhanging position and which lies in the path of movement of said channel member so as to be engaged by said channel member when said channel member is pivoted relative to said mounting head and said latch is moved transversely outward with respect to said mounting head.

7. In a wiper arm as claimed in claim 5 wherein said latch means has a locking portion which engages with a tab on said insert means when said latch means is in position to latch the arm to the drumhead, said interconnection between said tab and said locking portion preventing said mounting head from being moved relative to said insert means thereby preventing fine adjustment of the arm relative to the insert means.

8. A wiper arm having a mounting head, a channel member pivotally connected to said mounting head with a wiper blade supporting extension connected to the outer end portion thereof, said arm having a longitudinal axis extending the length of said arm, a surface formed on said mounting head and having a plurality of teeth formed thereon, insert means nested in said mounting head and having an opening with a plurality of equally spaced flutes formed around the inner surface thereof, said insert means having a longitudinal axis, a surface portion on said insert means having teeth formed thereon and adapted to engage with the teeth on said surface on said mounting head, spring means on said mounting head for urging the teeth on the mounting head into engagement with the teeth on said insert means, said spring means is a coil spring extending between the upper surface of said insert means and the mounting head, a drive shaft having a drumhead on the end portion thereof, a plurality of equally spaced flutes formed on the outer surface of said drumhead, said drumhead seating in said opening in said insert means with the longitudinal axis of the arm having a particular orientation with respect to the longitudinal axis of the insert means, whereby depressing the mounting head and spring means will separate the teeth on said surface on the mounting head from the teeth on the surface of said insert means so that the mounting head and attached arm can be rotated in increments relative to the insert means and whereby releasing said mounting head will reengage the teeth on the surfaces of the insert means and mounting head so that the longitudinal axis of the arm will lie at a different angle to the longitudinal axis of said insert means.

9. In a wiper arm as claimed in claim 1 wherein said spring means is a V-shaped spring with one leg of the "V" bearing on the insert means and the other leg of the "V" engaging said mounting head.

10. A wiper arm having a mounting head, a channel member pivotally connected to said mounting head and having a longitudinal axis, said mounting head having a surface portion with a plurality of teeth formed thereon, an insert member nested in said mounting head and having a longitudinal axis, said insert member having an opening with a plurality of equally spaced flutes formed around the inner surface thereof, said insert member having a surface portion with teeth formed thereon and adapted to engage with the teeth on said surface portion of said mounting head, spring means extending between said mounting head and said insert member for urging said teeth on the mounting head into engagement with the teeth on said insert member, a drive shaft having a drumhead on the end portion thereof with a plurality of equally spaced flutes formed on the outer surface of said drumhead, said drumhead seating in said opening in said insert member with the longitudinal axis of the arm having a particular orientation with respect to the longitudinal axis of the insert member, latch means transversely slidable on said mounting head and having a latch portion for securing said arm to said drumhead whereby movement of the mounting head relative to the insert member disconnects said teeth so that the mounting head and attached arm can be rotated relative to the insert member in predetermined increments and whereby releasing said mounting head will reengage said teeth so that the longitudinal axis of the arm will lie at a different angle to the longitudinal axis of said insert member.

11. A wiper arm having a mounting head with a longitudinal axis, said mounting head having mounting means and fine adjustment means disposed therein, said mounting means and fine adjustment means having a longitudinal axis, a drive shaft having a drumhead mounted on one end portion, said drumhead having vertial fluting adapted to coact with said mounting means, spring means engaging said mounting head and said fine adjustment means for urging said head and said fine adjustment means into interlocking engagement, and means for positioning said mounting means and fine adjustment means relative to said drumhead and mounting head to orient said longitudinal axis of the mounting means and fine adjustment means relative to said longitudinal axis of the arm.

* * * * *